Figure 1:
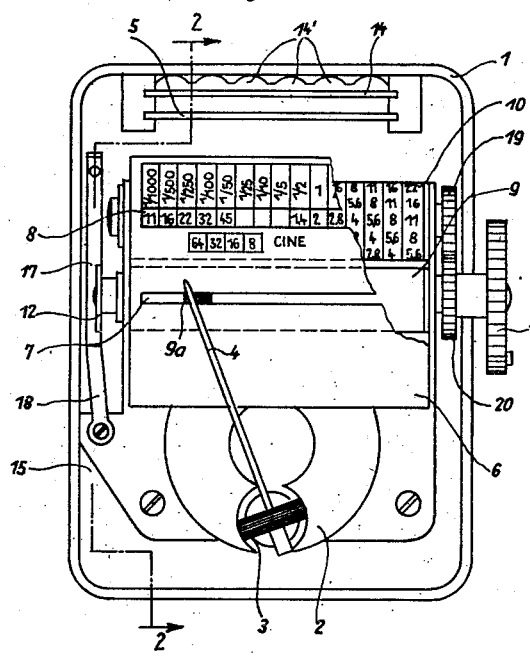

April 19, 1955 E. PFAFFENBERGER ET AL 2,706,428
PHOTO-ELECTRIC EXPOSURE METER
Filed July 2, 1952 4 Sheets-Sheet 1

INVENTORS:
Erwin PFAFFENBERGER
Herbert POPPA
Karl GOETZ
Attorney

April 19, 1955   E. PFAFFENBERGER ET AL   2,706,428
PHOTO-ELECTRIC EXPOSURE METER
Filed July 2, 1952   4 Sheets-Sheet 2

INVENTORS:
Erwin PFAFFENBERGER
Herbert POPPA
Karl GOETZ.
Attorney

INVENTORS:
Erwin PFAFFENBERGER
Herbert POPPA
Karl GOETZ
Attorney

April 19, 1955 — E. PFAFFENBERGER ET AL — 2,706,428
PHOTO-ELECTRIC EXPOSURE METER
Filed July 2, 1952 — 4 Sheets-Sheet 4

INVENTORS:
Erwin PFAFFENBERGER
Herbert POPPA
Karl GOETZ
Attorney

United States Patent Office 2,706,428
Patented Apr. 19, 1955

2,706,428

PHOTO-ELECTRIC EXPOSURE METER

Erwin Pfaffenberger, Herbert Poppa, and Karl Goetz, Erlangen, Germany, assignors to P. Gossen & Co., G. m. b. H., Erlangen, Bavaria, Germany Application July 2, 1952, Serial No. 296,808

Claims priority, application Germany July 11, 1951

7 Claims. (Cl. 88—23)

This invention relates to certain improvements in or relating to photo-electric exposure meters.

It is an object of the present invention to provide an exposure meter which is suitable for the measurement of reflected as well as incident light.

Another object of the invention is to provide an exposure meter which is suitable for "still" and "cine" work, and for black and white and colour photography.

Still another object of the invention is to provide an exposure meter which is fully automatic and shock-proof.

A special object of the invention is to provide an exposure meter which can easily be converted from a condition for measurement by the reflected light method to measurement by the incident light method or into its inoperative condition without requiring the attachment of a separate or the pivoting of a hinged front member serving to diffuse the light or to shut the light-admission opening of the exposure meter.

With these and further objects in view, according to the present invention the opal front screen or filter member is slidably arranged so that it can be moved before the light-admission aperture of the exposure meter. More particularly, according to a special feature of the invention, the opal front screen is constructed in the form of a flexible roller blind or revolving shutter which moreover is adapted to serve not only as a diffusing blind but also as a closing shutter.

It is preferred to provide the opal filter or shutter on a photo-electric exposure meter having a honey-comb light-admission aperture and comprising a follow-up indicator in which an indicating pointer is arranged to move over a moving member which member is provided with indicia markings or curved lines which are viewed through a slit whereby the pointer positions will coincide with an indicia or a curved line or area defined by adjacent lines. In this indicator, it is preferred for the moving member to be a roller and it will be understood that the position of said member determines a measuring value or the like.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 2:
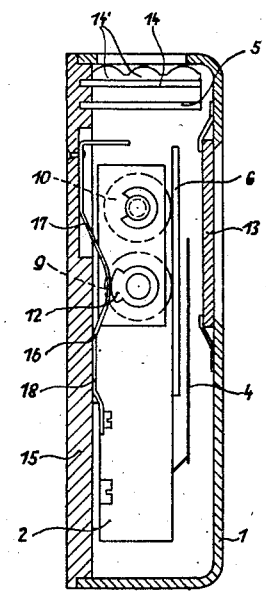
Figure 3:
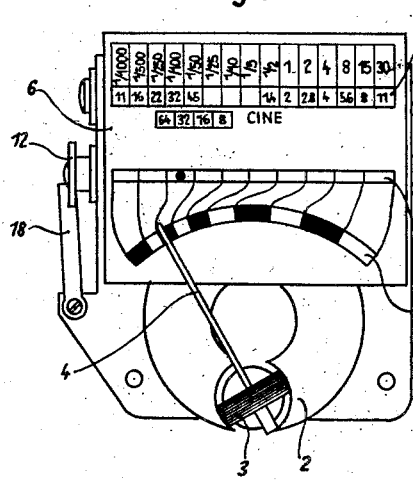
Figure 5:
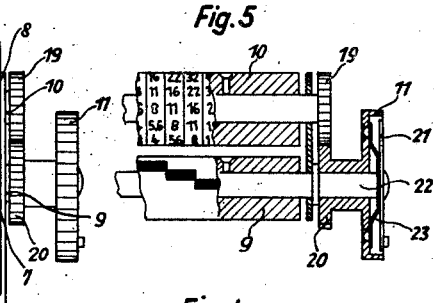
Figure 4:
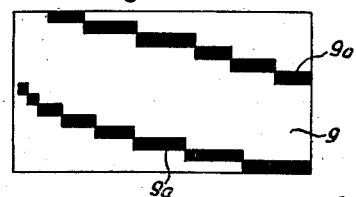
Figure 6:
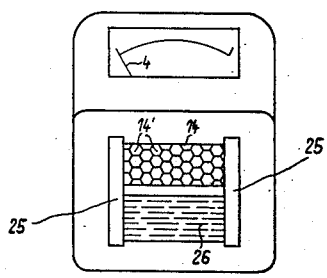
Figure 7:
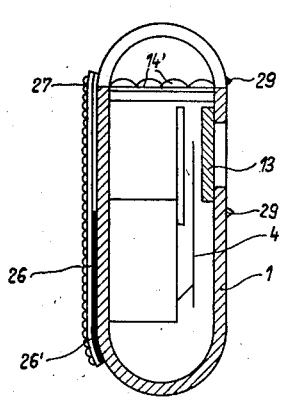
Figure 8:
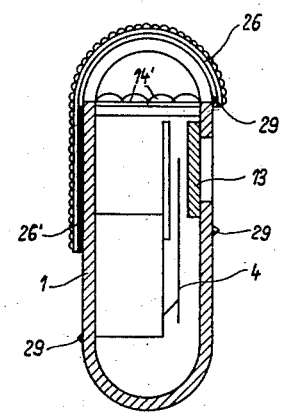
Figure 9:
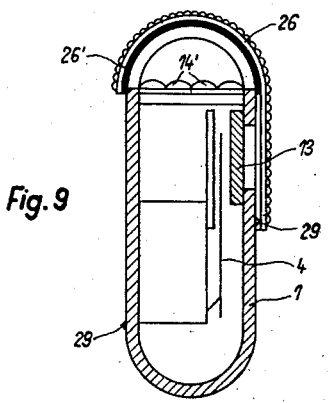
Figure 16:
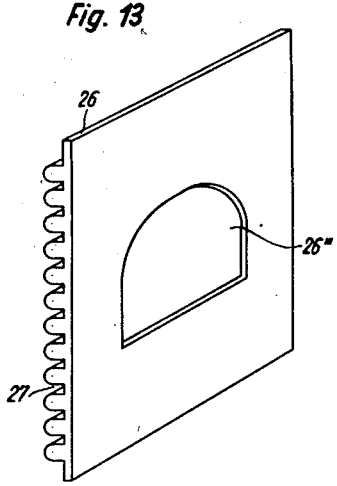
Figure 19:
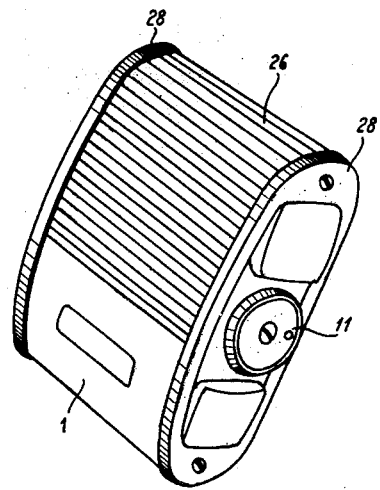
Figure 17:
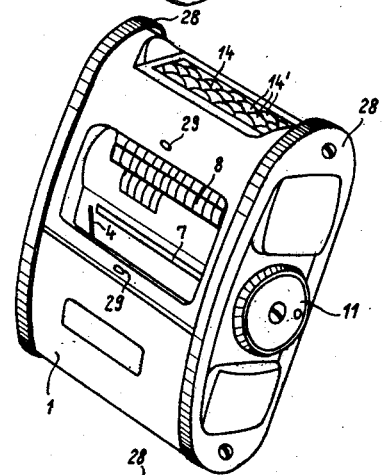
Figure 18:
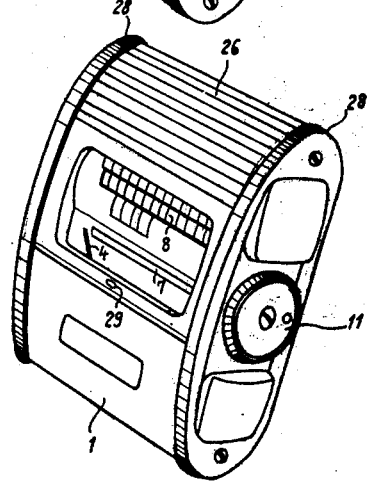

Fig. 1 is a plan view of a preferred form of an exposure meter to which the present invention may be applied, with the front of the cover removed and part of the scale and cover plate removed, Fig. 2 is a cross section on the line 2—2 of Fig. 1, Fig. 3 is a view similar to Fig. 1 showing the roller indicator combined with a normal exposure meter, Fig. 4 is a view in section, of a detail, Fig. 5 is a diagrammatic view showing the development of a preferred form of roller surface, Fig. 6 is a diagrammatic plan view of an exposure meter having the invention applied thereto, Fig. 7 is a longitudinal section of a modified form of an exposure meter having the invention applied thereto, with roller blind, in an open condition of the roller blind, Fig. 8 is a similar view, but showing the roller blind in a position for filtering or blinding the aperture through which the photo-electric cell can be exposed to light, Fig. 9 is a similar view, but showing the roller blind or shutter in a closed position so as to cover not only the light-admission aperture but also the inspection window through which the scale of the exposure-meter can be viewed, Figs. 10 to 16 are isometric views showing various forms of flexible members adapted to be used as shutter members, Fig. 17 is a perspective view of the exposure meter as per Fig. 7, Fig. 18 is a perspective view of the exposure meter as per Fig. 8, and Fig. 19 is a perspective view of the exposure meter as per Fig. 9.

Similar reference numerals denote similar parts in the different views.

Referring now to the drawings in greater detail, and first to Figs. 1 to 5, showing a preferred type of exposure meter to which the present invention may be applied although not being restricted to application in connection with said type of exposure meter, it will be seen that the exposure meter has a casing 1 behind which is an electro-magnet 2 having the moving coil 3 between its poles said coil carrying the pointer 4. The photoelectric cell 5 is connected to the coil 3 so that the light intensity falling on the cell determines the position of the pointer 4. The said pointer 4 moves over the cover plate 6 which has a slot 7 over which the pointer moves and also a slot 8 above the slot 7, the surfaces of the rollers 9, 10, being viewed respectively through the slots 7, 8. The spindle of the roller 9 has the hand turning wheel 11 at its one end, and a cam 12 at its other end. The plate 6 is viewed through the window 13 whilst the light-admission aperture in the top of the casing 1 is mechanically closed by a transparent plate 14 consisting of a plurality of honeycomb elements 14' each of which is adapted in per se known manner, to define the aperture angle of its surface element to the aperture angle of a photographic camera, so that the photo-electric cell when exposed to light will receive the same amount of light as the objective of the camera. The parts of the instrument are mounted on a back plate 15.

As shown in the drawings Figs. 1–4, the roller 9 is cylindrical, but the said roller could be of a polygonal cross-section. The roller surface as shown is provided with indicia markings 9a arranged stepwise although it will be understood that the markings could be of other forms for example, a continuous curved line could be provided. The character of the markings or curved line is functionally equivalent to that of the indicating device.

In its simplest form, the computing or regulating operation is obtained by turning the roller 9 so that an indicia mark or the like is beneath the pointer and this results in the advancement of the computing or regulating operation. In the example shown, the pointer moves according to a function characteristic of the measuring operation, and the computing mechanism is linearly advanced or operated as a result of equal angular movements. The "following up" by the indicator roller and therefore the whole desired computing or regulating procedure can be effected by a self-starting device (for example a zero motor) instead of manually as shown.

The contact points 16, one on the springy blade 17, the other on the blade 18, both of which blades are mounted on the back plate 15, provide for the opening or closing of an external electrical circuit to a change over device. The movement of the blade 17 is effected by the cam 12, so that in the case of a meter having a plurality of ranges, electrical conversion can be automatically effected over the desired part of movement of the roller 9. It will be clear however, that in the case of a meter having a plurality of ranges, the mechanical, optical, or electrical conversion can be automatically effected by suitable means on a roller axis, or other corresponding part of the device.

The drive between the rollers 9, 10 is by the cogs 19, 20 through the wheel 11 which is integral with the cog 20. In order that the rollers 9, 10, may be set if necessary, to different positions, the drive to the two rollers is such that one can be moved independently of the other. As shown (Figure 4) the wheel 11 is dished, and a disc 21 is received in the dishing which wheel is formed with a sleeve like part in which the roller spindle 22 takes its bearing, the cog 20 being integral with this sleeve, whilst the disc 21 is fixedly secured to the roller spindle 22. A suitable friction coupling such as the spring 23 is provided so that normally the disc 21 and wheel 11 are turned together, but if desired, the disc can be turned whilst the wheel 11 is held stationary. A click-stop or other device may be provided to maintain the parts and the adjustment may be for the presetting of the device.

As shown in Figure 1, the follow up indicator is combined with a photo-electric exposure meter which serves to give direct indication of time and diaphragm openings. The indicator roller 9 has on its surface stepped indicia marks the characteristics of which correspond to the lux second indications of the measuring instrument and constitute together with the pointer of the measuring device, the roller follow-up indicator. On the scale roller 10 which moves under the slot 8, there are provided stepped rows of aperture values so arranged that they stand opposite the exposure time (for still photographs) provided above the slot 8, and the frame advance speed (for moving pictures) provided below the slot 8.

In case of measuring by the reffected light method, the measuring operation is effected by subjecting the exposure meter to the object to be photographed, so that the pointer 4 assumes a certain position. The wheel 11 is turned until the indicia mark on the roller 9 appears in the slot 7 in alignment with the pointer 4. The scale roller 10 also turns and the aperture values appearing in the slot 8 corresponding to the pointer deflection, can be read off against the exposure times or frame exposure speed without further calculation.

Further, and as shown in Figure 3, the roller follow-up indicator can be used with a normal exposure meter. In this case, the roller 9 has uniform divisions, and the conversion of the non-uniform scale intervals of the indicator scale 24 into the uniform scale intervals is effected by "channels" or curved lines. The uniform ends of the channels can also be swept over by a known form of follow up pointer which in turn moves the scale roller by any suitable mechanical transmission. In this case also, the roller 9 could be replaced by a transparent roller around the roller 10.

Since a correct exposure depends not only on the exposure time and aperture opening but also on the sensitivity of the film coating, it will be understood that means will also be provided in all cases for the adjustment relatively of the two rollers (for example by the arrangement of the disc 21 and wheel 11 as described above) or the transparent cylinder and roller or follow up indicator and scale roller.

The measuring by the incident light method will now be described with reference to Figs. 6–19.

Referring at first to Fig. 6, it will be seen that the casing 1 is formed with a pair of guide strips or rails 25 for slidable guiding of the filter or other front screen 26 which in its upper position covers the honeycomb plate 14 of the light-admission aperture whilst in its lower position said aperture is freely exposed to the full and unscreened action of the incident or deflected light to be measured. The front plate 26 may consist of a light-diffusing material, adapted to enlarge the aperture angle of plate 14 to 180°, or of a material which simply forms a grey screen or of a material by which certain fractions of the light are intercepted or retained or allowed to pass, respectively, thus forming a filter element. Also, the plate 26 may be interchangeable for applying different types of filters or screens.

According to a preferred form of the present invention the member 26 is constructed in the form of a flexible sheet or strip having deep incision or recesses 27 and being guided between curved guide strips 28 or recesses of the casing, as shown in Figs. 7, 8, 9 and 17, 18, 19. In this way, it is possible to provide three or more different positions of the shutter 26 to perform different functions. More particularly, there may be provided three different positions as follows:

1. Open position of the shutter 26 so as to freely expose the light-admission aperture 14, as shown in Figs. 7 and 17, for normal measurement according to the reflected light method.

2. Intermediate position of the opal shutter 26, as per Figs. 8 and 18, so as to cover the light-admission aperture 14 but leaving the inspection window 13 freely exposed, for measurement under special conditions, more particularly, for measuring according to the incident light method.

3. Closed position of the opal shutter 26, as per Figs. 9 and 19, so as to cover both the light-admission aperture 14 and the inspection window 13, for non-use and transport of the exposure meter. In this case, the exposure meter is effectively protected against injury and soiling.

The opal shutter 26 preferably consists of a suitable synthetic material, more particularly, a thermoplastic material which lends itself for moulding according to the injection moulding process, such as polyamides and polyurethanes of the kind known under the trade names or registered trade marks of Igamid and Ultramid.

The transparency and colour of the material of the shutter depends on the special purpose for which it is intended to be used. Where it serves to reduce the light intensity incident upon the photo-electric cell so as to use the same scale for measurements according to the reflected light method (shutter 26 removed from light-admission aperture) and for measurements according to the incident light method (shutter 26 covering plate 14), its colour may be neutral grey or milk white opal.

In this case, the opal shutter is adapted in such a way that in measuring a wall surface of a neutral grey colour of an average remission capacity according to the reflected light method, with the shutter removed from the light-admission aperture 14, the same deflection of the pointer is obtained as in measuring the light incident on this wall surface through the shutter. In a practical embodiment of the exposure meter operating in the general manner as described with reference to Figs. 1 to 5 the light radiated from a diffuse source of light of a large surface of sufficient size is reduced by the opal shutter 26 to about one quarter of its original value.

The portion of the shutter 26 which is intended to cover the light-admission aperture 14 in a closed and inoperative position of the exposure meter, may be additionally covered on its inner side of an opaque material or layer 26' to prevent the light from falling on the photo-electric cell in a non-operative condition of the exposure meter.

It should be noted that the roller blind or flexible shutter 26 may serve various other purposes in addition or alternatively to the purposes hereinbefore described and it may be adapted for such other purposes accordingly. Thus, for instance, it may be used to reduce the light incident on the photoelectric cell, gradually or in steps, to change the measuring range or as an additional or alternative method of measuring or gauging, or controlling the instrument, in such a way that the position of the shutter which has to be adjusted to obtain a predetermined position of the pointer defines the measuring value.

For instance, where in the incident light method, with the opal shutter in front of the light aperture, a new film is inserted, having another sensitivity than the previous one, a predetermined ASA value may be left maintained on the knurled knob 11, Fig. 18, and instead of readjusting the knob 11 the opal shutter may be readjusted to a predetermined mark.

Figure 10:
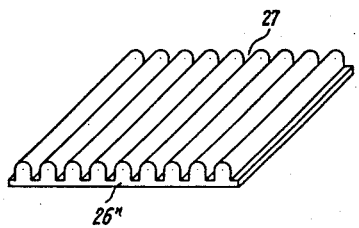
Figure 11:
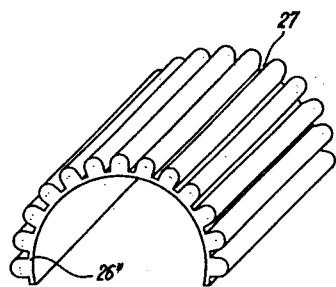
Figure 12:
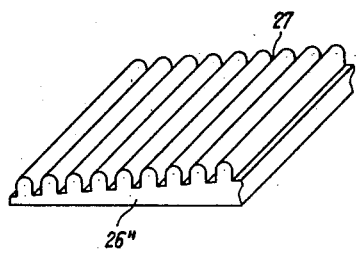
Figure 13:
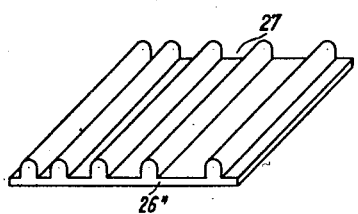
Figure 14:
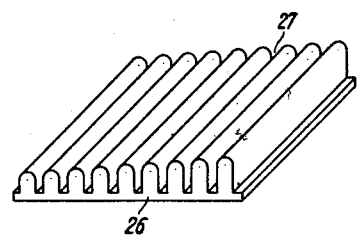
Figure 15:
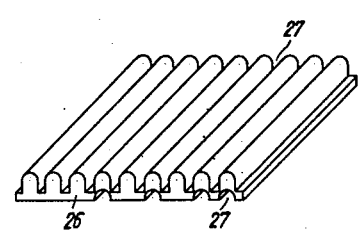

To this end, the shutter may be moved into a position where the opaque portion 26', Fig. 9, partly covers the light aperture 14, or the opal portion 26" which normally is shaped in accordance with Figs. 10 and 11 may have an increasing thickness of its non-recessed part, Fig. 12, or the recesses may be of different width, Fig. 13, or of different depth, Fig. 14, or additional recesses may be provided on the inner side of the shutter, as per Fig. 15, or the same may be provided with a cut-out or window 26''', as per Fig. 16.

Similarly, for "Cine" photography, the chosen film speed (frames per second) may be taken care of by readjustment of a shutter which is shaped in accordance with one of Figs. 12 to 16.

Moreover, in case of colour photography under poor light conditions or in case of objects of a darker colour a specially marked position of the shutter may take care of such conditions to obtain a longer exposure time as regards the indication. In other words, the different exposure conditions can thus be taken care of. Again, where it is intended to take care of certain colour effects, for instance, to suppress the effect of a colour which is ineffective in respect to the chosen type of film material, while being active in regard to the photo-electric cell, the shutter 26 may have one or more filter portions by which this color fraction is filtered out.

Shutters with variable opacity as per Figs. 12 to 16 may also be used for any other gauging and control purposes in connection with exposure meters or for other photographic purposes.

Projections 29 of casing 1, Figs. 7–9, may be provided for cooperation with corresponding recesses in the shutter 26 so as to hold the same in the respective definite position.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

We claim:

1. A photoelectric exposure meter comprising a casing having two parallel side walls and formed with a light-admission aperture in one of its end walls, means in said aperture for limiting its aperture angle to that of a photographic camera, a photoelectric cell element behind said aperture angle limiting means, indicating means controlled by said cell element and including a pointer and scale means arranged behind an inspection window of the casing for cooperation with the pointer, substantially semi-circularly curved guide means in the end portions of said side walls directed towards the aperture, and a translucent front screen in the form of a flexible strip which is slidably guided in said guide means and adapted to be selectively moved into a first position for covering the aperture and into a second position for exposing said aperture, said flexible strip consisting of a relatively thin sheet formed integral with substantially thicker transverse bar-shaped ribs provided on the outer side of the sheet and adapted to reduce the amount of light admitted to the cell to such an extent, in the first position of the strip, that the same exposure figures of the scale are applicable for incident light measurement in the first position of the strip, and for reflected light measurement, in the second position of the strip, respectively.

2. A photoelectric exposure meter comprising a casing having two parallel side walls and formed with a light-admission aperture in one of its end walls, a transparent sheet arranged in said aperture and comprising a plurality of honey-comb elements each of which limits the aperture angle to that of a photographic camera, a photoelectric cell element behind said aperture angle limiting means, indicating means controlled by said cell element and including a pointer and scale means arranged behind an inspection window of the casing for cooperation with the pointer, substantially semi-circularly curved guide means in the end portions of said side walls directed towards the aperture, and a translucent front screen in the form of a flexible strip which is slidably guided in said guide means and adapted to be selectively moved into a first position for covering the aperture and into a second position for exposing said aperture, said flexible strip consisting of a relatively thin sheet formed integral with substantially thicker transverse bar-shaped ribs provided on the outer side of the sheet and adapted to increase the aperture angle of the exposure meter to 180° while reducing the amount of light admitted to the cell to such an extent, in the first position of the strip, that the same exposure figures of the scale are applicable for incident light measurement in the first position of the strip, and for reflected light measurement, in the second position of the strip, respectively.

3. A photoelectric exposure meter comprising a casing having two parallel side walls and formed with a light-admission aperture in one of its end walls, means in said aperture for limiting its aperture angle to that of a photographic camera, a photoelectric cell element behind said aperture angle limiting means, indicating means controlled by said cell element and including a pointer and scale means arranged behind an inspection window of the casing for cooperation with the pointer, substantially semi-circularly curved guide means in the end portions of said side walls directed towards the aperture, and a translucent front screen in the form of a flexible strip which is slidably guided in said guide means and adapted to be selectively moved into a first position for covering the aperture and into a second position for exposing said aperture, said flexible strip consisting of a relatively thin sheet of synthetic plastic material formed integral with substantially thicker transverse bar-shaped ribs provided on the outer side of the sheet and adapted to reduce the amount of light admitted to the cell to such an extent, in the first position of the strip, that the same exposure figures of the scale are applicable for incident light measurement in the first position of the strip, and for reflected light measurement, in the second position of the strip, respectively.

4. A photoelectric exposure meter comprising a casing having two parallel side walls and formed with a light-admission aperture in one of its end walls, means in said aperture for limiting its aperture angle to that of a photographic camera, a photoelectric cell element behind said aperture angle limiting means, indicating means controlled by said cell element and including a pointer and scale means arranged behind an inspection window of the casing for cooperation with the pointer, substantially semi-circularly curved guide means in the end portions of said parallel side walls directed towards the aperture, and an opal front screen in the form of a flexible strip which is slidably guided in said guide means and adapted to be selectively moved into a first position for covering the aperture and into a second position for exposing said aperture, said flexible strip consisting of a relatively thin sheet of injection-moulded thermoplastic material formed integral with substantially thicker transverse bar-shaped ribs provided on the outer side of the sheet and having a cross section corresponding substantially to a rectangle topped by a semicircle for reducing the amount of light admitted to the cell to such an extent, in the first position of the strip, that the same exposure figures of the scale are applicable for incident light measurement in the first position of the strip, and for reflected light measurement, in the second position of the strip, respectively.

5. A photoelectric exposure meter comprising a casing having two parallel side walls and formed with a light-admission aperture in one of its end walls, means in said aperture for limiting its aperture angle to that of a photographic camera, a photoelectric cell element behind said aperture angle limiting means, indicating means controlled by said cell element and including a pointer and scale means arranged behind an inspection window of the casing for cooperation with the pointer, U-shaped guide means in the end portions of said parallel side walls directed towards the aperture, and a translucent front screen in the form of a flexible strip which is slidably guided in said guide means and adapted to be selectively moved into a first position for covering the aperture and the inspection window, into a second position for exposing said inspection window while covering said aperture, and into a third position for exposing said inspection window and said aperture, said flexible strip consisting of a relatively thin sheet formed integral with substantially thicker transverse bar-shaped ribs provided on the outer side of the sheet and adapted to reduce the amount of light admitted to the cell to such an extent, in the second position of the strip, that the same exposure figures of the scale are applicable for either incident light measurement in the second position of the strip, or for reflected light measurement, in the third position of the strip, the inner surface of said thin sheet including an opaque portion covering the light-admission aperture in said first position.

6. A photoelectric exposure meter comprising a casing having two parallel side walls and formed with a light-admission aperture in one of its end walls, means in said aperture for limiting its aperture angle to that of a photographic camera, a photoelectric cell element behind said aperture angle limiting means, indicating means controlled by said cell element and including a pointer, two rotary rollers, a fixed plate with two view slots overlying the respective rollers, in an axial direction thereof, means for manually rotating one of said rollers, and gear means between the rollers whereby rotation of one of them is imparted to the other, one of said rollers extending across the range of movement of the pointer and having on its superficies at least one series of staggered marks adapted to be successively exhibited in the respective view slot in such a way that only one of said marks when exhibited in the view slot will coincide with the actual position of the pointer, and the other of said rollers bearing a plurality of axially directed rows of aperture numbers adapted to be successively exhibited in the respective view slot and being related to at least one stationary row of figures representing corresponding exposure times provided along at least one of the longitudinal edges of said slot to enable selection of the suitable pair of aperture numbers and exposure times, said marks and said rows of aperture numbers being correlated in such a manner that the proper row of aperture numbers corresponding to the magnitude of the light sensed will be exhibited in the respective slot if the position of the pointer coincides with the exhibited mark, substantially semi-circularly curved guide means in the end portions of said side walls directed towards the aperture, and a translucent front screen in the form of a flexible strip which is slidably guided in said guide means and adapted to be selectively moved into a first position for covering the aperture and into a second position for exposing said aperture, said flexible strip consisting of a relatively thin sheet formed integral with substantially thicker transverse bar-shaped ribs provided on the outer side of the sheet and adapted to reduce the amount of light admitted to the cell to such an extent, in the first position of the strip, that the same exposure figures of the scale are applicable for either incident light measurement in the first position of the strip, or for reflected light measurement, in the second position of the strip.

7. A photoelectric exposure meter comprising a casing having two parallel side walls and formed with a light-admission aperture in one of its end walls, between the parallel side walls, means in said aperture for limiting its aperture angle to that of a photographic camera, a photoelectric cell element behind said aperture angle limiting means, indicating means controlled by said cell element and including a pointer and scale means arranged behind an inspection window of the casing for cooperation with the pointer, substantially semi-circular guide means in the end portions of said parallel side walls directed towards the aperture, and a translucent front screen in the form of a flexible strip which is slidably guided in said guide means and adapted to be selectively moved into a first position for covering the aperture and the inspection window, into a second position for exposing the inspection window while covering the aperture, and into a third position for exposing said inspection window and said aperture, said flexible strip consisting of a relatively thin sheet formed integral with substantially thicker transverse bar-shaped ribs provided on the outer side of the sheet and adapted to reduce the amount of light admitted to the cell to such an extent, in the second position of the strip, that the same exposure figures of the scale are applicable for either incident light measurement in the second position of the strip, or for reflected light measurement, in the third position of the strip, said flexible strip and said casing having mutually cooperating projections and recesses at points substantially midway between the side walls for securing the strip at least in its first and third positions, by snapping engagement.

References Cited in the file of this patent

UNITED STATES PATENTS 2,612,817    Willcox _____ Oct. 7, 1952

OTHER REFERENCES

"Photo-Technick and Wirtschaft," March 1951, pages 99, 100, 101; published in Berlin, Germany.